Figure 1:
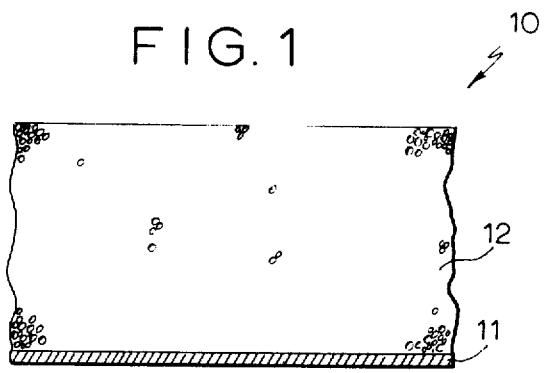

United States Patent [19]
Moss

[11] 3,876,620
[45] Apr. 8, 1975

[54] PROCESS OF PREPARING PHENOLIC-ALDEHYDE POLYMER USING O-CRESOL
[75] Inventor: Ernest K. Moss, St. Petersburg, Fla.
[73] Assignee: The Celotex Corporation, Tampa, Fla.
[22] Filed: Apr. 26, 1973
[21] Appl. No.: 354,636

[52] U.S. Cl............... 260/57 R; 161/215; 161/257; 161/264; 260/2.5 F; 260/29.3; 260/55; 260/619 B
[51] Int. Cl.............................................. C08g 5/08
[58] Field of Search............... 260/55, 57 R, 619 B

[56] References Cited
UNITED STATES PATENTS
1,975,884  10/1934  Weith .............................. 260/57
2,744,875  5/1956  Thomas et al..................... 260/2.5 F
3,297,637  1/1967  Akabori et al.................... 260/57 X FOREIGN PATENTS OR APPLICATIONS
1,147,564  4/1969  United Kingdom Primary Examiner—Howard E. Schain
Attorney, Agent, or Firm—James W. Grace; David R. Murphy

[57] ABSTRACT

Phenolic polymers which can be produced by reacting ortho-cresol with other phenolic materials, such as phenol, are described. Phenolic compositions comprising these phenolic polymers mixed with other phenolic materials, cellular materials produced from these phenolic polymers having low friability, and related processes and products are also described.

11 Claims, 2 Drawing Figures

PROCESS OF PREPARING PHENOLIC-ALDEHYDE POLYMER USING O-CRESOL

Phenolic polymers have been known for decades. More recently there has been increased interest in phenolic polymers which can be formed into cellular materials more commonly referred to as foams. See for example Thomas et al. U.S. Pat. No. 2,744,875 (1956); Nelson Canadian Patent No. 674,181 (1963); Dijkstra Canadian Patent No. 684,388 (1964); Wissenfels et al. Canadian Patent No. 866,876 (1971); United Kingdom specification No. 598,642 (1948); and Australian Patent No. 128,508 (1945). A number of the cellular materials described in these and in other patents exhibit advantageous properties of compressive strength, self-extinguishing character, and low thermal conductivity. However, known cellular materials produced from phenolic polymers exhibit an undesirably high friability. This undesirably high friability is accompanied by increased dustiness and low tensile strength. In fact, this undesirably high friability has practically precluded the use of phenolic polymers as structural laminates such as wallboard. See also Modern Plastics Encyclopedia Volume 41, pages 362–363 (1964).

Accordingly, it is an object of the present invention to provide an improved phenolic polymer substantially free of the disadvantages of prior polymers.

Another object is to provide an improved phenolic polymer, an improved phenolic composition employing the phenolic polymer, an improved process for producing both the phenolic polymer and the phenolic composition, improved cellular materials employing the phenolic polymer, an improved process for producing such cellular materials and an improved laminated building panel employing phenolic polymers.

A further object of the present invention is to provide a phenolic polymer which, when formed into a cellular product, exhibits a low friability generally less than 15 and preferably less than 10%.

A still further object is to provide an improved phenolic polymer which, when formed into a cellular material, exhibits low friability without adversely affecting compressive strength, its self-extinguishing character, and/or its thermal conductivity.

Figure 2:
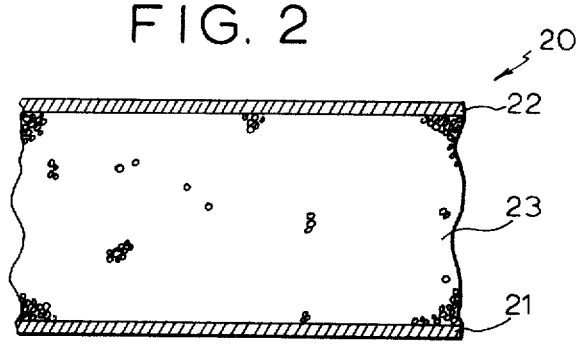

Additional objects and advantages of the present invention will be apparent to those skilled in the art by reference to the following detailed description and drawings wherein:

FIG. 1 is a cross-sectional view of a laminated building panel having one facing sheet; and FIG. 2 is a cross-sectional view of a laminated building panel having two facing sheets.

According to the present invention, there is provided an improved alkylol group containing phenolic polymer of Formula I:

(I) 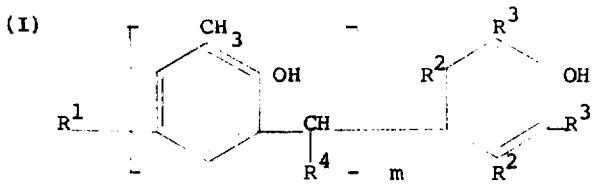

wherein $R^1$ is

hydrogen, or a radical of Formula II:

(II) 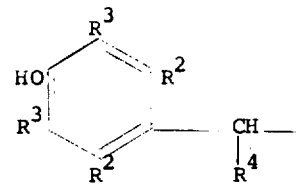

The $R^2$'s are independently selected from the group consisting of lower alkyl, phenyl, benzyl, halo, nitro, and hydrogen. The $R^3$'s are independently selected from the group consisting of

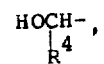

hydrogen, or a radical of Formula II.

The $R^4$'s are independently selected from the group consisting of lower alkyl, hydrogen, phenyl, benzyl, or furyl. By furyl is meant the radical introduced by the use of furfural. In Formula I, $m$ is an integer from 2 to 10 inclusive and is preferably an integer from 2 to 6 inclusive. When $m$ is less than 2, a foam produced from such a phenolic polymer tends to have too high a friability. On the other hand, as $m$ exceeds 10, the viscosity of the polymer increases to the point where it is difficult to produce the foam. The phenolic polymers of the present invention generally have a molecular weight between 200 and 2,000 and preferably have a molecular weight between 300 and 1500. At lower molecular weights, the resultant foams tend to have too high a friability, whereas at high molecular weights the viscosity of the phenolic polymer, even when a solvent is present, tends to be too high to permit processing within a reasonable time.

A preferred subclass of phenolic polymers are those of Formula III:

(III) 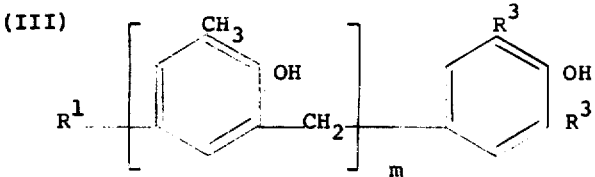

In Formula III, $R^1$ is $HOCH_2-$, hydrogen, or a radical of Formula IV:

(IV) 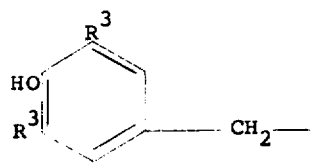

The $R^3$'s are independently selected from the group consisting of $HOCH_2-$, hydrogen, or a radical of Formula IV.

In a preferred embodiment of the present invention, at least one of the $R^3$'s is methylol, i.e. $HOCH_2-$. This is to ensure that there will be cross-linking sites on the phenolic polymer. Of course, such methylol groups or, when the aldehyde is other than formaldehyde, alkylol groups, are automatically introduced into the polymer as is well-known in the art by the process described below.

In the broadest aspects of the present invention, the phenolic polymer can contain widely varying ratios of the radicals of Formula II or IV to ortho-cresol units. However, this ratio is generally from 1:3 to 3:1 and is preferably from 1:1.5 to 1.5:1. At lower ratios, i.e. a deficiency of radicals of Formula II or IV, the resultant cellular product tends to be too soft, probably by virtue of decreased cross-linking, whereas at higher ratios, i.e. deficiency of ortho-cresol, the cellular material produced from such a phenolic polymer, tends to be too friable. In determining the above ratios, one must include the radicals of Formula II or IV present in Formula I or III respectively.

PHENOLIC COMPOSITION

According to another aspect of the present invention, there is provided an improved phenolic composition which can be reacted to form the cellular materials of the present invention. These phenolic compositions comprise the phenolic polymer of Formula I or Formula III, together with a compound of Formula V:

(V) 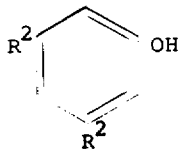

The compound of Formula V can be present in the phenolic composition in widely varying ratios but is generally present in a weight ratio of 1:30 to 1:2 and is preferably present in a weight ratio of 1:20 to 1:5. Examples of suitable compounds of Formula V include among others: m-cresol, m-chlorophenol, m-nitrophenol, 3,5-xylenol, and phenol, i.e. hydroxy benzene. Phenol is the most preferred compound of Formula V because of cost, availability, and reactivity.

PROCESS

The phenolic polymers of Formula I and Formula III are produced according to the present invention by combining certain reactants in a two-step process. In this process, Step I must be practiced before Step II. it has been found that practicing the steps in the reverse order does not result in polymers of the present invention. Likewise, practicing the process of the present invention as a single step process wherein the ortho-cresol and the compound of Formula V are added simultaneously does not result in phenolic polymers from which can be produced cellular materials having the herein described low friability.

In Step I of the process of the present invention, ortho-cresol is reacted with an aldehyde of Formula VI:

(VI) 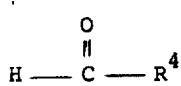

to produce an intermediate product of Formula VII:

(VII) 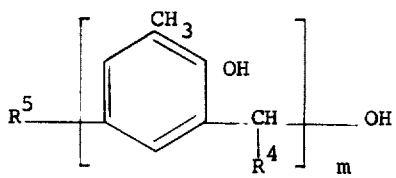

wherein $R^5$ is hydrogen or

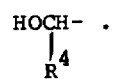

In Step II, the intermediate product of Formula VII is reacted with an additional amount of the same or a different aldehyde of Formula VI and with a compound of Formula V. The resultant reaction product is a phenolic polymer of Formula I or, when the compound of Formula V is phenol, the resultant product is a polymer of Formula III.

Step I can be practiced at widely varying temperatures from below 30° to above 150°C but is generally practiced within these temperature limits and preferably between 60° and 100°C. Step I can be practiced at sub-atmospheric pressure or super-atmospheric pressure but is generally practiced at atmospheric pressure for convenience. In certain industrial applications of the process of the present invention, it may be advantageous to practice Step I at reduced pressure in order to remove water of condensation which is produced during the reaction. In Step I the molar ratio of aldehyde of Formula VI to ortho-cresol can vary widely but is generally between 0.5:1 and 5:1 and preferably between 1:1 and 3:1. At lower ratios there is insufficient aldehyde to react with the ortho-cresol. Molar ratios in excess of 5:1 do not adversely affect Step I but introduce into the reaction vessel unnecessary aldehyde which may have to be removed for reasons explained more completely below. Selection of temperatures and pressures for Step II employs the same considerations as those of Step I. The aldehyde present in Step II can be added separately or can be the residual aldehyde left from Step I. The total amount of aldehyde provided to the reaction in both Steps I and II is critical to optimum practice of the process of the present invention and it must be present in a site ratio of 1:0.40 to 1:0.75 and preferably in a site ratio of 1:0.46 to 1:0.60. In calculating the site ratio, it may be assumed that the ortho-cresol has two sites, i.e. reactive sites, and that the compound of Formula V has three reactive sites. The site ratio is defined as the quantity (2 times the moles of o-cresol plus 3 times the moles of compound of Formula V) all divided the moles of aldehyde. The site ratio is normally expressed as a ratio, i.e. 1:0.40, rather than as a fraction, i.e. 1/0.40, or as a whole number, i.e. 2.5.

According to an important aspect of the present invention, it is possible to produce the above-described phenolic compositions directly in one vessel concurrently with the synthesis of the phenolic polymers of the present invention. This is possible provided the above-described site ratios are maintained and provided that the compound of Formula V is present in the above-described ratio and provided the ratio of radicals of Formula IV or II to o-cresol is within the hereindescribed limits.

Step I of the process of the present invention can be practices with either acidic or basic catalysts. Stated differently, the intermediate produce of Formula VII can be produced either in the form of a Resole or in the form of a Novolak. On the other hand, it has been found that Step II must be practiced in the presence of a basic catalyst, i.e. as a Resole. Examples of suitable basic catalysts include, among others, sodium hydroxide, potassium hydroxide, calcium hydroxide, and barium hydroxide. Sodium hydroxide is preferred because of the solubility of sodium acetate formed when the catalyst is neutralized in a subsequent reaction step.

Examples of suitable acidic catalysts include, among others, HCl; $H_3PO_4$; $H_2SO_4$; arylsulfonic acids such as benzene sulfonic acid and toluene sulfonic acid.

After practicing Step II of the process, it is conventional to neutralize the basic catalyst. Any mineral or organic acid can be employed to neutralize the basic catalyst. Examples of suitable acids include, among others, acetic acid, oxalic acid, lactic acid, trichloroacetic acid, benzene sulfonic acid, toluene sulfonic acid, xylene sulfonic acid, hydrochloric acid, sulfuric acid, and phosphoric acid. The preferred acid is acetic acid because its reaction product with sodium hydroxide is sodium acetate. Sodium acetate is soluble in the phenolic polymer of the present invention and therefore does not have to be removed by filtration. On the other hand, oxalic acid can be employed if the resultant sodium oxalate is filtered from the reaction product.

In Steps I and II the catalyst is employed in an amount sufficient to catalyze the reaction and is generally present in molar ratios of 1:10 to 1:160 and preferably 1:40 to 1:80 moles of catalyst per total moles of o-cresol and phenolic compound of Formula V. At lower ratios the reaction time is uneconomically slow, whereas at higher ratios there is no attendant benefit and the reaction becomes different to control.

ALDEHYDES

In the broadest aspects of the present invention, any aldehyde can be employed. Examples of suitable aldehydes include among others furfural, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

CELLULAR MATERIAL

The cellular material of the present invention is formed by simply reacting the alkylol group containing phenolic polymer of Formula I or Formula III and the compound of Formula V under conditions such that a cellular product will result. As is well known in the phenolic foam art, the reaction can be conducted in the presence of a foaming catalyst, a blowing agent, and a surfactant. The cellular materials of the present invention generally have a conductivity, $k$ value, of from 0.1 to 1.0 and preferably from 0.1 to 0.3 BTU-inch/Hr-°-F-sq. ft.

FOAMING CATALYST

In the broadest aspects of the present invention, any catalyst which will enhance the cross-linking and foaming reaction can be employed in the present invention. However, the preferred foaming catalysts are aromatic sulfonic acids, examples of which include, among others, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid, as described in Mausner et al. U.S. Pat. No. 3,458,449. Another foaming catalyst which has been found to give excellent results is a blend of toluene sulfonic acid, phosphoric acid, and water in a weight ratio of 35–50:50–35:15.

The catalyst is generally present in the minimum amount that will give the desired cream times of 10 to 50 seconds and firm times of 40 to 500 seconds to the reacting mixture. The catalyst, however, generally comprises foam 0.5 to 20, and preferably comprises from 1.0 to 15, weight percent based on the weight of the cellular material.

THE BLOWING AGENT

Any blowing agent characteristically employed in similar prior art products can be employed in the composition of the present invention. In general, these blowing agents are liquids having an atmospheric pressure boiling point between minus 50° and 100°C and preferably between 0° and 50°C. The preferred liquids are hydrocarbons or halohydrocarbons. Examples of suitable blowing agents include, among others, chlorinated and fluorinated hydrocarbons such as chloroform, trichlorofluoromethane, $CCl_2FCClF_2$, $CCl_2FCF_3$, diethylether, n-pentane, cyclopentane, and 2-methylbutane. Trichlorofluoromethane is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperature until mixed with the other components.

THE SURFACTANT

Successful results have been obtained with silicone/ethylene-oxide/propylene-oxide copolymers as surfactants. Examples of suitable surfactants include, among others, alkoxy silanes, polysilylphosphonates, polydimethyl siloxane, and polydimethylsiloxane-polyoxyalkylene copolymers.

Examples of specific, commercially available surfactants useful in the present invention include, among others, polydimethylsiloxane-polyoxyalkylene block copolymers available from the Union Carbide Corporation under the tradename "L-5420" and "L-5340" and from the Dow Corning Corporation under the tradenames "DC-193" and "DC-195."

The surfactant generally comprises from 0.05 to 10, and preferably comprises from 0.1 to 6, weight percent of the phenolic composition. Non-ionic surfactants are generally preferred.

Referring now to the drawings, and in particular to FIG. 1, there is shown a laminated building panel 10 of the present invention. The building panel 10 comprises a single facing sheet 11 having thereon a cellular material 12 of the present invention. FIG. 2 shows a building panel 20 having two facing sheets 21 and 22 on either side of a cellular material 23.

Any facing sheet previously employed to produce building panels can be employed in the present invention. Examples of suitable facing sheets include, among others, those of kraft paper, aluminum, and asphalt impregnated felts, as well as laminates of two or more of the above.

Cream time is the time interval beginning with the addition of the catalyst and ending when the composition begins to rise. Unless otherwise indicated, the reactants are mixed under ambient conditions of atmospheric pressure and room temperature (25°C).

Firm time is the time interval between catalyst addition and the firm point. Firm time is measured by periodically pressing by hand the top of the rising foam with a tongue depresser (a stick approximately 6 × ¾ × 1/16 inches). When the tongue depresser no longer penetrates the surface, the time is noted. The elapsed time from addition of catalyst to this point is termed the firm time.

Friability is the propensity of the foam to break expressed in percent weight loss. This is determined by the ASTM C-421 friability test conducted for 10 minutes.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example is illustrative of the present invention.
The following quantities of the following ingredients are combined as illustrated.

| Item | Name | Quantity grams | gram-moles |
|---|---|---|---|
| A | ortho-cresol | 389 | 3.6 |
| B | HCHO (93.6% paraformaldehyde) | 144 | 4.5 |
| C | NaOH (50% solution) | 7.2 | 0.09 |
| D | HCHO | 121 | 3.8 |
| E | phenol | 338 | 3.6 |
| F | acetic acid | 6 | 0.1 |

Items A, B, and C are reacted at 90°C for 4.75 hours in Step I to form a mixture. In Step II, items D and E are added to the mixture of Step I and the temperature is maintained at 90°C for 2 hours. Then Item F is added to neutralize to a pH of 5.0 to 7.0 and the reaction products are cooled to room temperature.

The items are calculated to be present in the following molar ratios:

| | |
|---|---|
| phenol: o-cresol | 1:1 |
| sites ratio | 1:0.46 |
| HCHO: o-cresol, Step I | 1.25:1 |
| NaOH: (phenol + o-cresol) | 1:80 |

The reaction products produced above had a viscosity of 17,000 centipoises at 25°C and constitute a phenolic composition of the present invention which analyzes as follows:

| | | |
|---|---|---|
| phenol | 10.7 | weight percent |
| cresol | 0 | weight percent |
| formaldehyde | 0.15 | weight percent |
| water | 9.1 | weight percent |
| phenolic polymer | balance | |

EXAMPLE 2

This example is illustrative of the present invention.
The following quantities of the following ingredients are combined as illustrated.

| Item | Name | Quantity grams | gram-moles |
|---|---|---|---|
| A | ortho-cresol | 1568 | 14.5 |
| B | HCHO (92.5%) | 707 | 21.7 |
| C | NaOH (50%) | 29.2 | 0.365 |
| D | phenol | 1364 | 14.5 |
| E | HCHO | 377 | 11.6 |
| F | acetic acid | 24 | 0.4 |

Items A, B, C, D, and E of Example 2 are reacted in the same order as in Example 1 except that Step I and Step II are maintained at 90°C for 2 and 2.5 hours respectively. Then F is added to the reactant mixture of Step II, followed by cooling to 50°C and maintaining at 50°C for 15 minutes. The reaction products are cooled to room temperature.

The items are calculated to be present in the following molar ratios:

| | |
|---|---|
| phenol: o-cresol | 1:1 |
| sites ratio | 1:0.46 |
| HCHO: o-cresol, Step I | 1.5:1 |
| NaOH: (phenol + o-cresol) | 1:80 |

The reaction product of Example 2 had a viscosity of 18,800 centipoises at 25°C and constitutes a phenolic composition of the present invention.

EXAMPLE 3

This example is of the present invention.
The following quantities of the following ingredients are combined as illustrated:

| Item | Name | Quantity grams | gram-moles |
|---|---|---|---|
| A | ortho-cresol | 392 | 3.63 |
| B | HCHO (92.5%) | 271 | 8.35 |
| C | NaOH (50%) | 7.3 | .09 |
| D | phenol | 341 | 3.63 |
| E | acetic acid | 6 | 0.1 |

Items A, B, C, and D, are reacted at 90°C for 5 hours and then E is added to neutralize the product mixture to a pH of 6.8. Then the product mixture is cooled to room temperature.

The items are calculated to be present in the following ratios:

| | |
|---|---|
| phenol: o-cresol | 1:1 |
| sites ratio | 1:0.46 |
| NaOH: (phenol + o-cresol) | 1:80 |

The polymer product of Example 3 is measured to have a viscosity of 17,000 centipoises at 25°C and constitutes a phenolic composition not representative of the present invention which analyzes as follows:

| | |
|---|---|
| phenol | 5.0 weight percent |
| cresol | 7.0 weight percent |
| formaldehyde | 0.2 weight percent |
| water | 9.9 weight percent |
| phenolic polymer | balance |

EXAMPLE 4

This example is comparative of the present invention.
The following quantities of the following ingredients are combined as illustrated:

| Item | Name | Quantity grams | gram-moles |
|---|---|---|---|
| A | ortho-cresol | 392 | 3.63 |
| B | HCHO (92.5%) | 146 | 4.5 |
| C | NaOH (50%) | 7.3 | 0.09 |
| D | HCHO (92.5%) | 175 | 3.85 |
| E | phenol | 341 | 3.63 |
| F | acetic acid | 6 | 0.1 |

Items E and D are reacted in presence of C at 90°C for 3 hours in Step 1, followed by the addition of reactants A and B to the mixture of Step 1 to give a mixture of Step 2. The Step 2 is carried out at 90°C for 3.3 hours followed by neutralization with F to obtain a pH of 6.8.

The items are calculated to be present in the ratios given below:

| | |
|---|---|
| phenol: o-cresol | 1:1 |
| sites ratio | 1:0.46 |
| NaOH (phenol + o-cresol) | 1:80 |

The phenolic composition produced in Step 2 has a viscosity of 17,400 centipoises. In this phenolic composition not representative of the present invention, the reaction of formaldehyde with phenol occurs first and the reaction of formaldehyde with o-cresol second. The resin analyzed as follows:

| | | |
|---|---|---|
| phenol | 1.9 | weight percent |
| cresol | 15.3 | weight percent |
| HCHO | 0.2 | weight percent |
| H₂O | 9.8 | weight percent |
| polymer | Balance. | |

EXAMPLE 5

This example is illustrative of the present invention.
The following quantities of the following ingredients are combined as illustrated:

| Item | Name | Quantity grams | gram-moles |
|---|---|---|---|
| A | ortho-cresol | 389 | 3.6 |
| B | HCHO (92.5%) | 130 | 4.0 |
| C | NaOH (50%) | 14.4 | 0.18 |
| D | HCHO | 143 | 4.4 |
| E | phenol | 338 | 3.6 |
| F | acetic acid | 12 | 0.2 |

In Step 1 Items A, B, and C are reacted at 90°C for 4 hours and then at 100°C for 1 hour. In Step II the reaction mixture from Step I and reactants E and D are reacted at 90°C for 0.75 hours. Then reactant F is added to neutralize the product to a pH of 6.5.

The reactants are estimated to be in the following ratios:

| | |
|---|---|
| phenol: o-cresol | 1:1 |
| sites ratio | 1:0.46 |
| HCHO: o-cresol, Step 1 | 1.1:1 |
| NaOH: (phenol + o-cresol) | 1:40 |

The reaction product of Example 5 is at a viscosity of 16,000 centipoises at 25°C and constitutes a phenolic composition of the present invention which analyzes as follows:

| | |
|---|---|
| phenol | 9.0 weight percent |
| cresol | 0 weight percent |
| formaldehyde | 0.5 weight percent |
| water | 8.0 weight percent |
| phenolic polymer | Balance. |

EXAMPLE 6

This exsmple is illustrative of the present invention wherein Step 1 is acid catalyzed.
The following quantities of the following ingredients are combined as illustrated:

| Item | Name | Quantity grams | gram-moles |
|---|---|---|---|
| A | ortho-cresol | 389 | 3.6 |
| B | HCHO (92.5%) | 130 | 4.0 |
| C | NaOH (50%) | 14.4 | 0.18 |
| D | HCHO | 143 | 4.4 |
| E | phenol | 338 | 3.6 |
| F | acetic acid | 12.4 | 0.2 |
| G | hydrochloric acid (concd.) | 0.6 | — |

In Step 1, Items A and G are mixed and warmed to about 70°C, then reactant B is added over a period of 2 hours followed by maintaining the temperature of the mixture at 90°–100°C for 0.5 hours. In Step II, the mixture from Step I and the reactants C, D and E are reacted at 90°C for 0.5 hours followed by neutralization with reactant F to obtain a pH of 6.6.

The reactants of Example 6 are calculated to be present in the following ratios:

| | |
|---|---|
| phenol: o-cresol | 1:1 |
| sites ratio | 1:0.46 |
| HCHO: o-cresol, Step 1 | 1.1:1 |
| NaOH: (phenol + o-cresol) | 1:40 |

The resultant phenolic composition had a viscosity of 14,000 centipoises at 25°C.

EXAMPLES 7, 8, 9, 10 and 11

Resins were prepared as in Example 1, except that the sites ratio was varied from 1:0.40 to 1:0.75. Reaction times and viscosities are shown in Table I. All resins were neutralized with acetic acid.

EXAMPLES 12, 13, 14, 15, 16 and 17

These resins were prepared as in Example 1, except the mole ratio of phenol to cresol was varied. All formaldehyde was added in Step 1 and catalyst ratio was increased to 1:40 to decrease the reaction time. Resin conditions and viscosities are compiled in Table II.

EXAMPLE 18

This example is comparative of the present invention and is illustrative of a phenolic polymer containing no o-cresol.

The following quantities of the following ingredients are combined as illustrated:

| Item | Name | Quantity grams | gram-moles |
|---|---|---|---|
| A | NaOH (50%) | 7.2 | 0.09 |
| B | HCHO (92.5%) | 323 | 10 |
| C | phenol | 677 | 7.2 |
| D | acetic acid | 6 | 0.1 |

Items A, B, and C are mixed and maintained at 90°C for 3.8 hours. Then Item D is added to give a pH of 6.5 to the resin product.

The reactants are present in the following ratios:

| | |
|---|---|
| Sites ratio | 1:0.46 |
| NaOH : phenol | 1:80 |

The resin product had a viscosity of 37,000 centipoises at 25°C.

EXAMPLE 19

This example is illustrative of the present invention.

The following quantities of the following ingredients are combined as illustrated:

| Item | Name | Quantity grams | gram-moles |
|---|---|---|---|
| A | ortho-cresol | 1568 | 14.5 |
| B | HCHO (92.5%) | 707 | 21.7 |
| C | NaOH (50%) | 14.6 | 0.18 |
| D | phenol | 1364 | 14.5 |
| E | HCHO | 377 | 11.6 |
| F | acetic acid | 24 | 0.4 |

In Step I, Items A and B are reacted in the presence of C at 90°C for 4.25 hours to give a mixture. In Step II, the reaction mixture of Step I and Items D and E are mixed and maintained at 90°C for 4.25 hours. Then Item F is added, cooled to 50°C and maintained at 50°C for 15 minutes. Then the reaction mixture is allowed to cool to room temperature.

The reactants are present in the following ratios:

| | |
|---|---|
| phenol : o-cresol | 1:1 |
| sites ratio | 1:0.46 |
| HCHO : o-cresol | 1.5:1 |
| NaOH : (phenol + o-cresol) | 1:160 |

The resin product had a viscosity of 19,000 centipoises at 25°C.

TABLE I

RESIN PREPARATION AT VARIOUS SITES RATIOS

| Example No. | Sites Ratio (3(moles phenol)+ 2 (moles cresol)): moles HCHO | Step 1. Moles HCHO: Moles Cresol | Reaction Time Hours Step 1 | Step 2 | Viscosity, cp at 25°C |
|---|---|---|---|---|---|
| 7 | 1:.40 | 1.5 | 2 | 4.2 | 16,200 |
| 8 | 1:.50 | 1.25 | 5 | 1.75 | 21,200 |
| 9 | 1:.55 | 1.25 | 5 | 1.5 | 22,000 |
| 10 | 1:.60 | 1.5 | 2 | 3.5 | 14,800 |
| 11 | 1:.75 | 1.5 | 2 | 1.7 | 14,400 |

Resin Conditions:
Reaction Temperature, °C.    90
Mole Ratio Phenol:Ortho Cresol    1:1
Moles NaOH: (Moles Phenol + Moles Cresol)    1:80

TABLE II

RESIN PREPARATION AT VARIOUS MOLE RATIOS FOR PHENOL TO CRESOL

| Example No. | Moles Phenol: Moles Cresol | Step 1 Moles HCHO: Moles Cresol | Reaction Time, Hrs. Step 1 | Step 2 | Viscosity, cp at 25°C |
|---|---|---|---|---|---|
| 12 | 1:1.5 | 1.8 | 1.5 | 2.0 | 15,000 |
| 13 | 1:1 | 2.3 | 1.5 | 2.5 | 15,000 |
| 14 | 1.25:1 | 2.6 | 1.5 | 3.7 | 16,200 |
| 15 | 1.5:1 | 3.0 | 1.5 | 5 | 14,000 |
| 16 | 2:1 | 3.7 | 1.5 | 5.6 | — |
| 17 | 3:1 | 5.1 | 1.5 | 9.0 | — |

Resin Conditions
Sites Ratio    1:.46
Moles NaOH:(Moles Phenol + Moles Cresol)    1:40
Reaction Temperature, °C.    90

EXAMPLE 20

This example illustrates the synthesis of foaming catalysts useful in the present invention.

The following quantities of the following ingredients are combined as indicated to produce Catalyst A:

| Item | Ingredients Name | Quantity grams |
| --- | --- | --- |
| A | p-toluene sulfonic acid | 333 |
| B | xylene sulfonic acids | 333 |
| C | water | 333 |

Items A, B, and C are mixed. The resultant composition is termed Catalyst A.

The following quantities of the following ingredients are combined as indicated to produce Catalyst B:

| Item | Ingredients Name | Quantity grams |
| --- | --- | --- |
| A | Ultra TX | 667 |
| B | water | 333 |

Items A and B are mixed. The resultant composition is termed Catalyst B. Ultra TX is a mixture of equal parts by weight of p-toluene sulfonic acid and xylene sulfonic acids available from the Witco Chemical Company.

EXAMPLE 21

This example illustrates the synthesis of a cellular material of the present invention.

The following quantities of the following ingredients are combined as indicated:

| Item | Ingredients Name | Quantity grams |
| --- | --- | --- |
| A | phenolic polymer of Ex. 1 | 80 |
| B | phenol | 11 |
| C | Catalyst B | 13 |
| D | CFCl$_3$ | 10 |
| E | polydimethyl siloxane polyalkylene oxide block copolymer | 2 |
| F | Water | 9 |

Items A through F are mixed in an open vessel whereupon a reaction ensues. The cream times and firm times are noted and recorded in Table III. Several hours later the density and friability are determined and recorded in Table III. Items A B and F are added together in the form of (100 g) of the phenolic composition of Example 1.

EXAMPLES 22 THROUGH 27

The procedure of Example 21 is repeated except that the phenolic composition of Example 1 is replaced successively by the phenolic compositions of Examples 2 through 6 and 18. The results are recorded in Table III.

By reference to Table III, it can be seen that cellular materials produced from phenolic polymers of the present invention, namely those of Examples 1, 2, 5 and 6, all exhibit low friability. On the other hand, cellular material produced from the phenolic polymer of Example 3 wherein Step I and Step II are practiced together has an undesirably high friability of 19 percent. Furthermore, the cellular material produced from the phenolic composition of Example 4 wherein Step II is practiced before Step I has an undesirably high friability of 60%. The comparative examples also exhibit an undesirably fast cream time. The cellular material produced from phenolic polymer of example 18 which contains no definitional phenol also produced an undesirably high friability of 55%.

EXAMPLE 28

The phenolic composition of Example 1 is spread on a paper facing sheet and produces the laminated panel 10 of FIG. 1.

EXAMPLE 29

The phenolic composition of Example 2 is placed between two facing sheets each comprising an asphalt impregnated felt commonly used as a roofing membrane.

EXAMPLE 30

This example illustrates the present invention employing other suitable commercially available surfactants.

The procedure of Example 21 is repeated except that the surfactant (item E) is replaced by the surfactant shown in Table IV with the results shown.

TABLE III

| Example No. | 21 | 22 | 23 | 24 | 25 | 26 | 27 |
| --- | --- | --- | --- | --- | --- | --- | --- |
| Phenolic polymer from Example Number | 1 | 2 | 3 | 4 | 5 | 6 | 18 |
| Cream Time (sec.) | 10–15 | 15–20 | <5 | <5 | 10–15 | 10–15 | 5–10 |
| Firm Time (sec.) | 180 | 150–180 | 120–150 | 120 | 200–240 | 180 | 240 |
| Density (lb per cu-ft) | 1.7 | 1.8 | 1.8 | 1.5 | 1.8 | 1.9 | 1.6 |
| Friability (%) | 8 | 8.5 | 19 | 60 | 15 | 15 | 55 |
| Illustrative (I) or Comparative (C) | I | I | C | C | I | I | C |

TABLE IV

| SURFACTANT Name | Description | Manufacturer | Cellular Material Friability (%) | Cell Structure |
| --- | --- | --- | --- | --- |
| SF-1165 | polydimethyl siloxane-polyalkylene oxide block copolymer | General Electric | 9 | small, uniform |
| L-5340 | same | Union Carbide | 7 | same |
| LK-221 | organic copolymer | Houdry | 8 | same |
| EL-719 | ethyoxylated vegetable oil | General Aniline & Film | 9 | same |
| Tween 40 | polyoxyethylene sorbitan palmitate | Atlas | 7 | medium, uniform |

Although the invention has been described in considerable detail with reference to certain preferred embodiments thereof, it will be understood that variations and modifications can be effected within the spirit and scope of the invention as described above and as defined in the appended claims.

What is claimed is:

1. A process for producing an alkylol group containing phenolic polymer of Formula I:

(I)
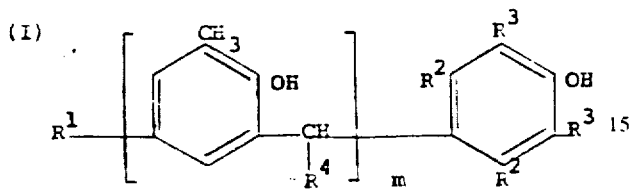

wherein:

a. $R^1$ is

hydrogen, or a radical of Formula II:

(II)
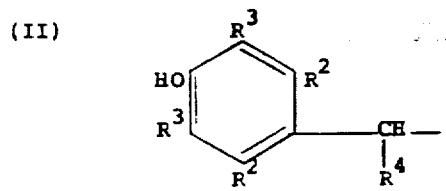

b. the $R^2$'s are independently selected from the group consisting of lower alkyl, phenyl, benzyl, halo, nitro and hydrogen, c. the $R^3$'s are independently selected from the group consisting of

hydrogen, or a radical of Formula II, wherein at least one of the $R^3$'s is alkylol, d. the $R^4$'s are independently selected from the group consisting of lower alkyl, hydrogen, phenyl, benzyl, or furyl, e. $m$ is an integer from 2 to 10 inclusive, f. the phenolic polymer has a molecular weight between 200 and 2000, said process comprising in sequence the steps of:

1. reacting o-cresol with an aldehyde of Formula VI:

(VI)
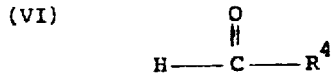

to produce an intermediate product of Formula VII:

(VII)
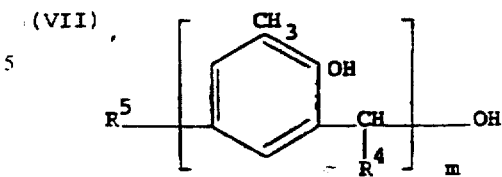

wherein $R^5$ is hydrogen or

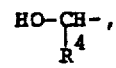

II. reacting the intermediate product of Formula VII with an aldehyde of Formula VI and with a compound of Formula V in the presence of a basic catalyst:

(V)
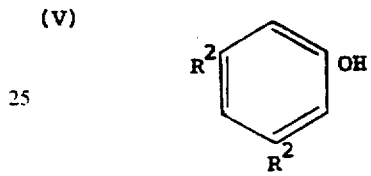

to produce the phenolic polymer of Formula I.

2. The process of claim 1 wherein Step I is practiced at a temperature of 30° to 150°C.

3. The process of claim 1 wherein Step I is practiced at atmospheric pressure.

4. The process of claim 1 wherein the molar ratio of aldehyde of Formula VI to o-cresol is between 0.5:1 and 5:1 in Step I.

5. The process of claim 1 wherein Step II is practiced at a temperature of 30° to 150°C.

6. The process of claim 1 wherein Step II is practiced at atmospheric pressure.

7. The process of claim 1 wherein the aldehyde of Formula VI employed in Steps I and II combined is present in a site ratio of 1:0.40 to 1:0.75.

8. A process for producing a methylol group containing phenolic polymer of Formula III:

(III)
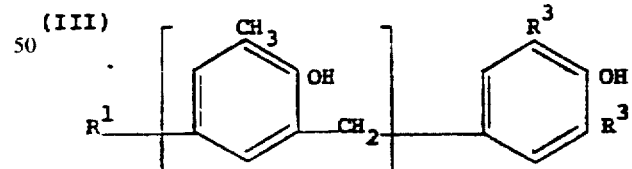

wherein:

a. $R^1$ is $HOCH_2-$, hydrogen, or a radical of Formula IV:

(IV)
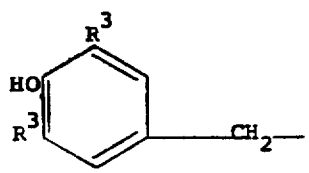

b. the $R^3$'s are independently selected from the group consisting of $HOCH_2-$, hydrogen, or a radical of Formula IV, wherein at least one of the $R^3$'s is methylol c. $m$ is an integer from 2 to 10 inclusive, d. the phenolic polymer has a molecular weight between 200 and 2000, said process comprising in sequence the steps of:

I. reacting o-cresol with formaldehyde to produce an intermediate product of Formula VIII:

(VIII) 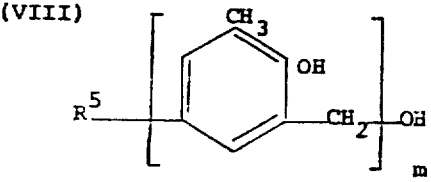

wherein $R^5$ is hydrogen or methylol,

II. reacting the intermediate product of Formula VIII with formaldehyde and with phenol in the presence of a basic catalyst to produce the phenolic polymer of Formula III.

9. A process for producing a methylol group containing phenolic polymer of Formula III:

(III) 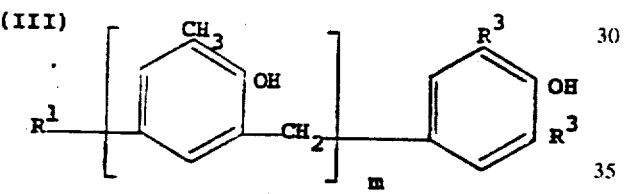

wherein:

a. $R^1$ is $HOCH_2-$, hydrogen or a radical of Formula IV:

(IV) 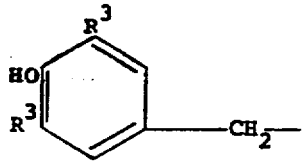

b. the $R^3$'s are independently selected from the group consisting of $HOCH_2-$, hydrogen or a radical of Formula IV, wherein at least one of the $R^3$'s is methylol, c. $m$ is an integer from 3 to 6 inclusive, d. the phenolic polymer has a molecular weight between 300 and 1500.

said process comprising in sequence the steps of:

I. reacting o-cresol with formaldehyde at 60° to 100°C in the presence of a basic catalyst to produce an intermediate product of Formula VIII:

(VIII) 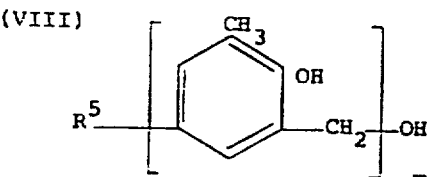

wherein $R^5$ is hydrogen or methylol, wherein the molar ratio of formaldehyde to o-cresol is between 1:1 to 3:1, II. reacting the intermediate product of Formula VIII with formaldehyde and with phenol at 60° to 100°C in the presence of a basic catalyst to produce the phenolic polymer of Formula III, with the proviso that the total formaldehyde employed in Steps I and II combined is present in a site ratio of 1:0.46 to 1:0.60 based on the assumption that o-cresol has two reactive sites and phenol has three reactive sites.

10. A process for producing a composition of matter comprising:

A. an alkylol group containing phenolic polymer of Formula I:

(I) 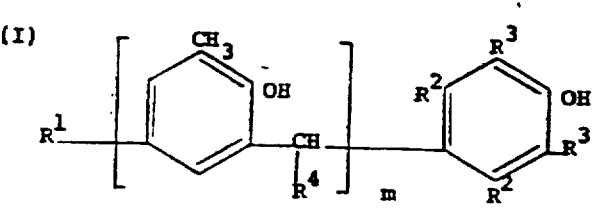

wherein:

a. $R^1$ is

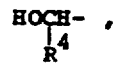

hydrogen or a radical of Formula II:

(II) 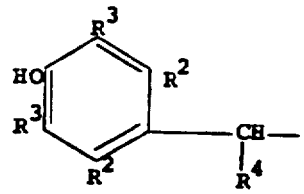

b. the $R^2$'s are independently selected from the group consisting of lower alkyl, phenyl, benzyl, halo, nitro and hydrogen, c. the $R^3$'s are independently selected from the group consisting of

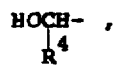

hydrogen, or a radical of Formula II, wherein at least one of the $R^3$'s is alkylol, d. the $R^4$'s are independently selected from the group consisting of lower alkyl, hydrogen, phenyl, benzyl, or furyl, e. $m$ is an integer from 2 to 10 inclusive, f. the phenolic polymer has a molecular weight between 200 and 2000, and B. a compound of Formula V (V) 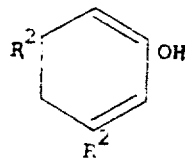

said process comprising in sequence the steps of:
I. reacting o-cresol with an aldehyde of Formula VI:

(VI) 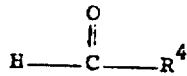

to produce an intermediate product of Formula VII:

(VII) 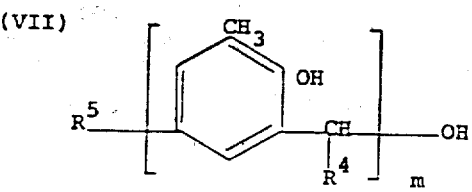

wherein $R^3$ is hydrogen or

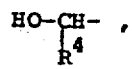

II. reacting the intermediate product of Formula VII with an aldehyde of Formula VI and with a compound of Formula V in the presence of a basic catalyst:

(V) 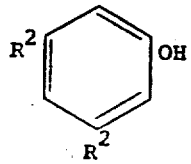

with the first provisio that the total aldehyde employed in Steps I and II combined is present in a site ratio of 1:0.40 to 1:0.75 based on the assumption that o-cresol has two reactive sites and the compound of Formula V has three reactive sites,
with the second proviso that the weight ratio of compound of Formula V to phenolic polymer is between 1:30 and 1:2.

11. A process for producing a composition of matter comprising:

A. a methylol group containing phenolic polymer of Formula III:

(III) 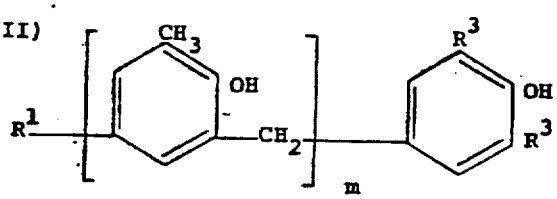

wherein:
a. $R^1$ is $HOCH_2-$, hydrogen or a radical of Formula IV:

(IV) 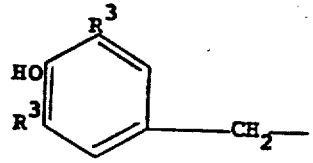

b. the $R^3$'s are independently selected from the group consisting of $HOCH_2-$, hydrogen or a radical of Formula IV, wherein at least one of the $R^3$'s is methylol,
c. $m$ is an integer from 3 to 6 inclusive,
d. the phenolic polymer has a molecular weight between 300 and 1500, and said process comprising in sequence the steps of:
I. reacting o-cresol with formaldehyde to produce an intermediate product of Formula VIII:

(VIII) 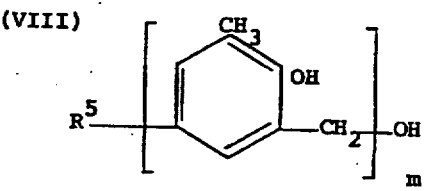

wherein $R^5$ is hydrogen or methylol,
II. reacting the intermediate product of Formula VIII with formaldehyde and with phenol, in the presence of a basic catalys
with the first proviso that the total formaldehyde employed in Steps I and II combined is present in a site ratio of 1:0.46 to 1:0.60 based on the assumption that o-cresol has two reactive sites and phenol has three reactive sites,
with the second proviso that the molar ratio of o-cresol to phenol to 1:3 to 3:1.

* * * * *